(12) United States Patent
Hori et al.

(10) Patent No.: US 7,923,170 B2
(45) Date of Patent: Apr. 12, 2011

(54) FUEL CELL SEPARATOR WITH A VAPOR-PHASE GROWN CARBON-BASED POROUS MATERIAL OF NANOSIZE STRUCTURE

(75) Inventors: Masaru Hori, Nisshin (JP); Mineo Hiramatsu, Aichi-gun (JP); Hiroyuki Kano, Nishijamo-gun (JP); Yukihisa Katayama, Toyota (JP); Toru Sugiyama, Nishikamo-gun (JP); Satoshi Yoshida, Toyota (JP)

(73) Assignees: Masaru Hori, Nisshin (JP); Mineo Hiramatsu, Aichi (JP); Toyota Jidosha Kabushiki Kaisha, Toyota (JP)

( * ) Notice: Subject to any disclaimer, the term of this patent is extended or adjusted under 35 U.S.C. 154(b) by 1106 days.

(21) Appl. No.: 11/659,104

(22) PCT Filed: Sep. 21, 2005

(86) PCT No.: PCT/JP2005/017920
§ 371 (c)(1),
(2), (4) Date: Feb. 1, 2007

(87) PCT Pub. No.: WO2006/033462
PCT Pub. Date: Mar. 30, 2006

(65) Prior Publication Data
US 2009/0042087 A1 Feb. 12, 2009

(30) Foreign Application Priority Data
Sep. 21, 2004 (JP) ................................. 2004-273082
Sep. 1, 2005 (JP) ................................. 2005-253451

(51) Int. Cl.
H01M 4/64 (2006.01)

(52) U.S. Cl. ........ 429/521; 429/517; 429/514; 427/115; 977/948

(58) Field of Classification Search ............... 429/521, 429/517, 519; 427/115, 113, 122; 264/105; 977/948, 932, 742, 752
See application file for complete search history.

(56) References Cited

U.S. PATENT DOCUMENTS

| 2004/0086768 | A1 | 5/2004 | Fleckner et al. |
| 2006/0027790 | A1* | 2/2006 | Arai et al. ................ 252/500 |
| 2006/0267235 | A1* | 11/2006 | Ma et al. ................ 264/105 |
| 2008/0187814 | A1* | 8/2008 | Hori et al. ................ 429/40 |

FOREIGN PATENT DOCUMENTS

| EP | 1 061 597 A2 | 12/2000 |
| EP | 1 160 900 A2 | 12/2001 |
| EP | 1 369 942 A2 | 12/2003 |
| JP | A 2001-288625 | 10/2001 |
| JP | 2002-97375 | * 4/2002 |
| JP | A 2002-97375 | 4/2002 |
| JP | A 2002-134135 | 5/2002 |

* cited by examiner

Primary Examiner — Raymond Alejandro
(74) Attorney, Agent, or Firm — Oliff & Berridge, PLC

(57) ABSTRACT

The degree of freedom in the shape of channels in a separator is increased, enabling an optimum gas channel to be designed, enabling a sufficient supply of gas below gas channel ribs, and improving cell performance through the reduction in diffusion polarization. Drainage property is also improved and flooding is prevented, thereby reducing diffusion polarization and improving cell performance. Cell performance is also improved through the reduction of contact resistance. A fuel cell separator comprises a separator substrate on which gas channel ribs are formed through vapor-phase growth of a carbon-based porous material with a nanosize structure. An electrode structure for a fuel cell, methods of manufacturing the separator and the fuel cell, and a solid polymer fuel cell comprising the electrode structure.

4 Claims, 14 Drawing Sheets

Top view

Side view

GAS PASSAGEWAY RIBS (CNWs)

(MEANDERING RIBS)

(FULL-SURFACE RIBS)

(DEAD-END RING)

- ELECTROLYTE MEMBRANE
- CATALYTIC LAYER (CATALYST+ELECTROLYTE)
- DIFFUSION LAYER (CNW-CONTINUOUS MEMBER)
- GAS PASSAGEWAY RIBS
- SEPARATOR (FLAT)

FUEL CELL SEPARATOR WITH A VAPOR-PHASE GROWN CARBON-BASED POROUS MATERIAL OF NANOSIZE STRUCTURE

TECHNICAL FIELD

The present invention relates to a fuel cell separator With gas channel ribs made of a nanoporous material, an electrode structure for a fuel cell, methods of manufacturing the fuel cell separator and the fuel cell structure, and a polymer electrolyte fuel cell.

BACKGROUND ART

A solid polymer fuel cell is comprised of a stack of single cells and two current collectors disposed on the outside of the stack. Each of the single cells consists of a solid polymer electrolyte membrane, two electrodes disposed on both sides of the solid polymer electrolyte membrane, and separators with gas-feeding grooves for feeding a fuel gas, such as hydrogen, and an oxidant gas, such as oxygen, to each of the electrodes.

The separators in the solid polymer fuel cell are required to have high levels of gas impermeability so as to allow the fuel gas and oxidant gas to be fed to the electrodes completely separately. In addition, the internal resistance of the battery is required to be minimized so as to achieve a high generation efficiency, and, for this reason, the separators are also required to be highly electrically conductive. Furthermore, in order to allow the heat accompanying the battery reaction to be efficiently dissipated and to obtain a uniform temperature distribution within the battery, the separators are required to have high thermal conductivity. To ensure long-term durability, the separators are also required to be highly corrosion-resistant. For these reasons, the separators in polymer electrolyte fuel cells are mainly made of stainless steel or carbon material.

The separators for fuel cells typically consist of a flat plate with a plurality of parallel grooves formed on one or both sides thereof. This configuration is adopted so as to ensure that the water produced in the grooves during electricity generation can be discharged, as well as to allow the electricity generated by a catalyst electrode in the fuel battery cell to be transmitted to the outside. The grooves are also used as channels for a reaction gas to flow into the fuel battery cell.

Normally, the fuel cell separator is made of a carbon or metal plate. To provide the plate with the gas channels, a carbon plate is generally mechanically machined, while a metal plate is generally press-molded. However, these techniques for providing gas channels have been problematic in that, for example: (1) the degree of freedom in the shape of the channel is small; (2) sufficient supply of gases below ribs cannot be ensured; (3) contact resistance is large; (4) flooding tends to occur under the ribs (namely, diffusion polarization is large); and (5) removal of the produced water is insufficient and cell performance is instable.

These problems are caused for the following reasons, for example. (1) When a carbon plate or a metal plate is used, as in the prior art, the shape of the channel is limited by machining or molding accuracies. As a result, fine shapes that would be resistant to flooding or drying-up cannot be realized. (2) In the exiting structures where the ribs are bulky, the issue of how to smoothly feed gases below the ribs, where the greatest amount of gas supplies are required, cannot be solved. (3) In the existing methods, the diffusion layer and the separator can only be formed as separate components, and the problem of contact resistance between the diffusion layer and the rib portion arises. (4) With the existing machining methods, it is difficult to selectively make only the portion below the ribs, where the amount of water produced is greatest, water repellent, thereby preventing improvements in drainage and cell performance. (5) In the existing methods, the separator is only partially provided with water-repellency or hydrophilic property, so that drainage cannot be performed in a detailed manner, resulting in a decrease in cell performance.

DISCLOSURE OF THE INVENTION

It is therefore an object of the invention to improve the degree of freedom in selecting the shape of the channel in the separator so that an optimum gas channel can be designed. It is another object of the invention to enable for a sufficient gas supply below the ribs in the gas channel, so as to improve the cell performance by reducing diffusion polarization. It is yet another object of the invention to reduce diffusion polarization, to improve cell performance by improving drainage and preventing flooding, and to achieve higher cell performance by reducing contact resistance.

The invention is based on the inventors' realization that the aforementioned objects can be achieved by forming the gas channel ribs on a separator substrate through vapor-phase growth of a carbon-based porous material with a nanosize structure. In particular, a carbon nanowall (CNW) was found to be most suitable as a carbon-based porous material with a nanosize structure. The structure of such carbon nanowall and methods of forming the same will be described later.

In one aspect, the invention provides a fuel cell separator comprising a separator substrate on which gas channel ribs are formed through vapor-phase growth of a carbon-based porous material with a nanosize structure. The formation of the gas channel ribs allows a sufficient amount of gas to be fed below such gas channel ribs, thereby reducing diffusion polarization and therefore improving cell performance.

In accordance with the invention, the gas channel ribs can be formed with any desired pattern through a selective growth by masking during the vapor-phase growth of the carbon-based porous material with a nanosize structure, or through etching after growth.

In accordance with the invention, a hydrophilic group and/or a hydrophobic group is provided on the surface of the gas channel ribs by chemical reaction, whereby drainage property can be improved and flooding can be prevented, and cell performance can be improved by a reduction of diffusion polarization. The hydrophilic group is preferably a hydroxyl group-containing compound, and the hydrophobic group is preferably a fluoride. The chemical reaction for imparting the hydrophilic group and/or the hydrophobic group is preferably performed after the vapor-phase growth of the carbon-based porous material with a nanosize structure through a series of steps in the same chamber.

Preferably, the fuel cell separator of the invention is provided with a gas diffusion layer for improving the passage of gas. Specifically, gas channel ribs are formed on the separator substrate through vapor-phase growth of a carbon-based porous material with a nanosize structure, and the gas diffusion layer is formed on the gas channel ribs through vapor-phase growth of a carbon-based porous material. The gas diffusion layer is formed such that the patterned gas channel is not buried.

Further preferably, a hydrophilic group and/or a hydrophobic group is provided on the surface of the gas diffusion layer by chemical reaction. The purpose and method of providing the hydrophilic group and/or the hydrophobic group are the same as mentioned above.

In a second aspect, the invention provides an electrode structure for a fuel cell. In this structure, a catalytic layer is provided on the gas diffusion layer of the fuel cell separator. The catalytic layer comprises a catalyst and a polymer electrolyte carried by a carrier. The catalyst, polymer electrolyte, and carrier may be those well known in the art.

In a third aspect, the invention provides a fuel cell comprising the aforementioned electrode structure for a fuel cell, which may be either planar or cylindrical in shape.

In a fourth aspect, the invention provides a method of manufacturing a fuel cell separator comprising the step of forming gas channel ribs on the separator substrate through vapor-phase growth of a carbon-based porous material with a nanosize structure. Particularly, the gas channel ribs can be formed by patterning with a high degree of freedom.

The carbon-based porous material with a nanosize structure may be either graphite or amorphous. Examples include fullerene, a carbon nanotube, a carbon nanohorn, and a carbon nanoflake. Of these, a carbon nanowall is most preferable, as mentioned above.

The carbon nanowall herein refers to a two-dimensional carbon nanowall structure. Typically, it has a wall-like structure where walls rise upward in substantially uniform directions from the surface of a substrate. Fullerene (such as C60) can be considered to be a zero-dimensional carbon nanostructure, and a carbon nanotube can be considered to be a one-dimensional carbon nanostructure. Although carbon nanoflakes consist of a group of two-dimensional, flat fragments similar to a carbon nanowall, they are more like rose petals and are not mutually connected. Further, the directionality of carbon nanoflake, which is a carbon nanostructure, with respect to the substrate is inferior to that of a carbon nanowall. Thus, a carbon nanowall is a carbon nanostructure with features totally different from those of fullerene, carbon nanotube, carbon nanohorn, or carbon nanoflake.

In accordance with the invention, the surface of the gas channel ribs can be provided with a hydrophilic group and/or a hydrophobic group by chemical reaction. The purpose and method of providing the hydrophilic group and/or the hydrophobic group are the same as mentioned above.

The fuel cell separator of the invention is preferably provided with a gas diffusion layer for improving the passage of gas. Specifically, gas channel ribs are formed on the separator substrate through vapor-phase growth of a carbon-based porous material with a nanosize structure, and a gas diffusion layer is formed on the gas channel ribs through vapor-phase growth of a carbon-based porous material. It is important that the gas diffusion layer is formed without burying the gas passage that has been patterned. In another method, CNWs for a diffusion layer are grown on a $SiO_2$ substrate, for example, separately from the CNW substrate that has been patterned. The two CNW substrates are then combined such that the CNWs are disposed opposite each other, and they are joined by pressure or the like. Thereafter, the $SiO_2$ in the diffusion layer CNWs is etched in a fluorine solution so as to remove the $SiO_2$ substrate.

Further preferably, the surface of the gas diffusion layer is provided with a hydrophilic group and/or a hydrophobic group by chemical reaction. The purpose and method of providing the hydrophilic group and/or the hydrophobic group are the same as mentioned above.

In a fifth aspect, the invention provides a method of manufacturing an electrode structure for a fuel cell such that a catalytic layer is provided on the gas diffusion layer of the above-described fuel cell separator. The catalytic layer comprises a catalyst and a polymer electrolyte carried by a carrier. The catalyst, polymer electrolyte, and carrier may employ those well known in the art.

In accordance with the invention, it becomes possible to use in a fuel cell electrode a carbon nanomaterial with a nanostructure such that microstructures, such as porosity, and macrostructures, such as patterns, can be freely modified. The invention also makes it possible to form the gas channel ribs and the diffusion layer in an integral manner. As a result, the following advantages can be obtained: (1) The degree of freedom of designing the gas channel structure increases; (2) Diffusion polarization decrease due to the provision of a gas channel at the rib portion; (3) The contact resistance between the separator and the GDL can be reduced; and (4) Flooding can be prevented by the improvement of the drainage property below the gas channel ribs. Thus, enhanced cell performance stability can be achieved.

Furthermore, in accordance with the invention, it becomes possible to manufacture a cell structure through a series of operations via vapor-phase reaction, thereby contributing to the reduction of manufacturing cost.

BEST MODES FOR CARRYING OUT THE INVENTION

Initially, a method of preparing carbon nanowalls (CNWs) most suitable as a carbon-based porous material with a nanosize structure will be described.

Figure 1:
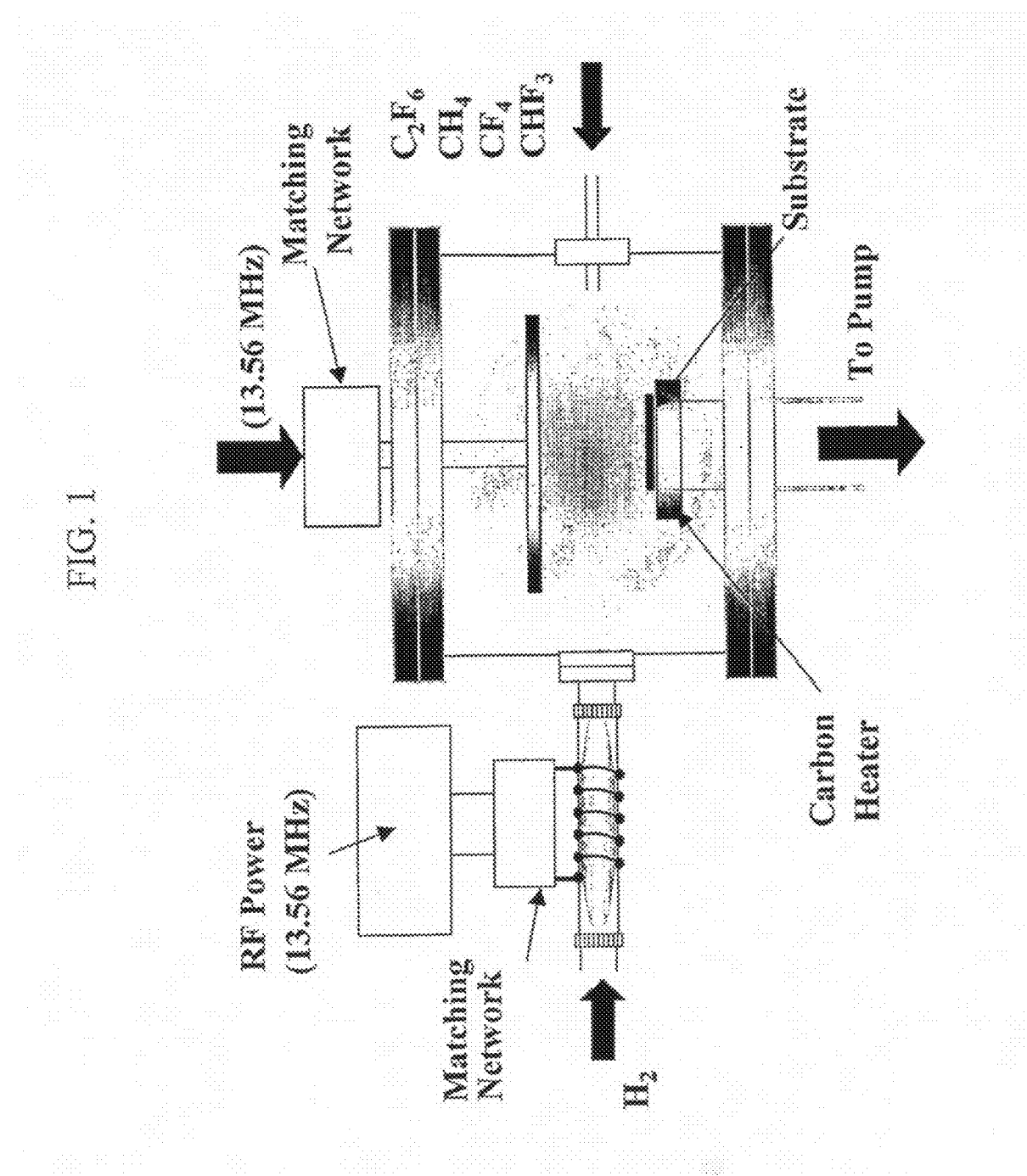
FIG. 1 schematically shows an apparatus for manufacturing CNWs.
Figure 2A:
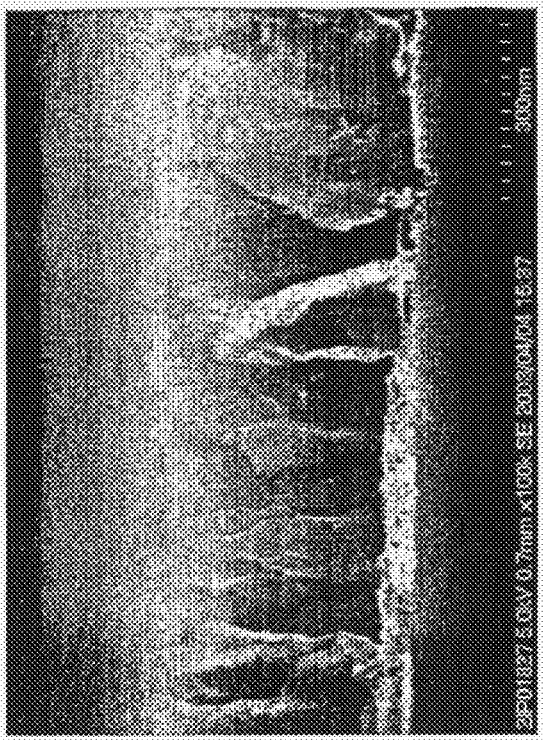
FIGS. 2A and 2B show SEM images of CNWs prepared using the apparatus of FIG. 1.
Figure 2B:
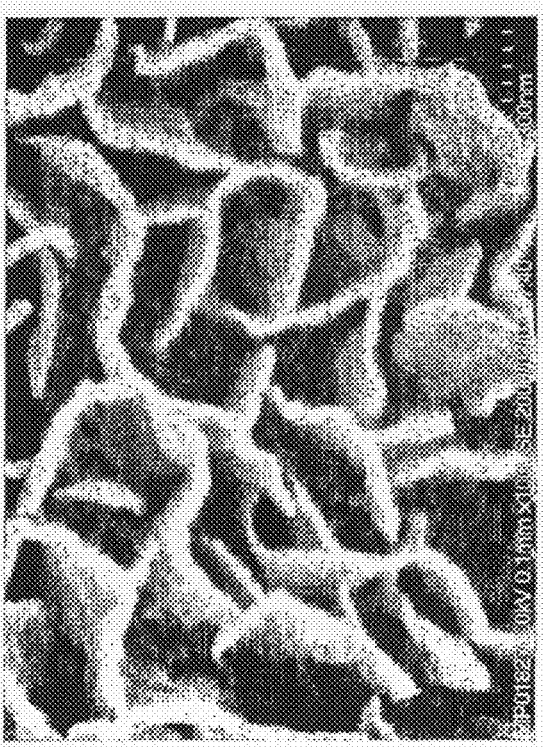

FIG. 1 schematically shows an apparatus for manufacturing a CNW. FIGS. 2A and 2B show SEM images of a CNW prepared using the apparatus of FIG. 1. With reference to FIG. 1, H radicals as well as a reaction gas containing carbon, such as $CF_4$, $C_2F_6$, or $CH_4$, was introduced between parallel flat-plate electrodes within a chamber shown in FIG. 1, where PECVD (plasma enhanced chemical vapor deposition) was performed. The substrate is preferably heated to approximately 500° C. Between the parallel flat-plate electrodes, which are spaced apart from one another by 5 cm, a capacitively coupled plasma is generated using high-frequency output apparatus of 13.56 MHz and an output of 100 W. The H radicals are produced in a silica tube with a length of 200 mm and an internal diameter $\phi$ of 26 mm, into which $H_2$ gas is introduced and an inductively coupled plasma is generated using high-frequency output equipment of 13.56 MHz and an output of 400 W. The flow rate of the material gas and the $H_2$ gas is 15 sccm and 30 sccm, respectively, and the pressure inside the chamber is 100 mTorr. When a CNW was grown in this system for eight hours, it had a height (thickness of the CNW film) of 1.4 μm. This, however, is merely an example, and it should be apparent to those skilled in the art that the experimental conditions, equipment, or the results of the invention are not limited by the passages above.

The invention will be hereafter described in greater detail with reference made to the drawings.

Figure 3:
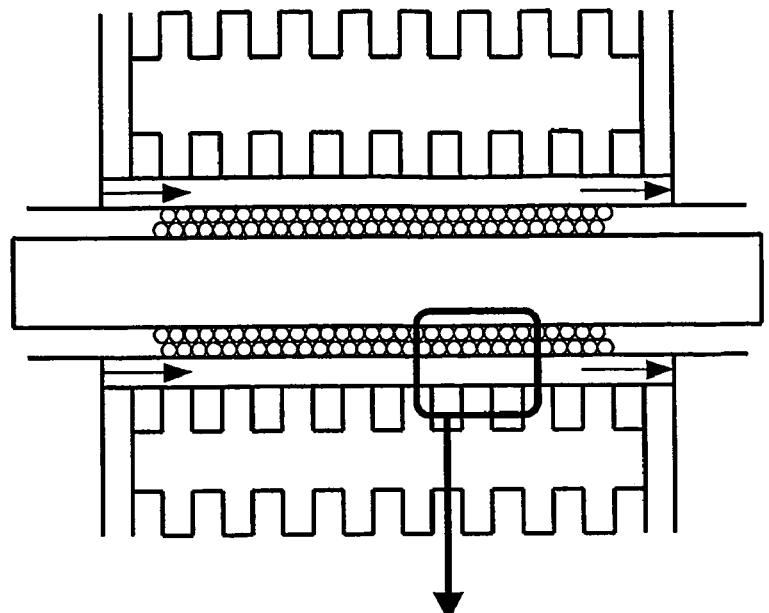
FIGS. 3A and 3B schematically show the invention.
Figure 3:
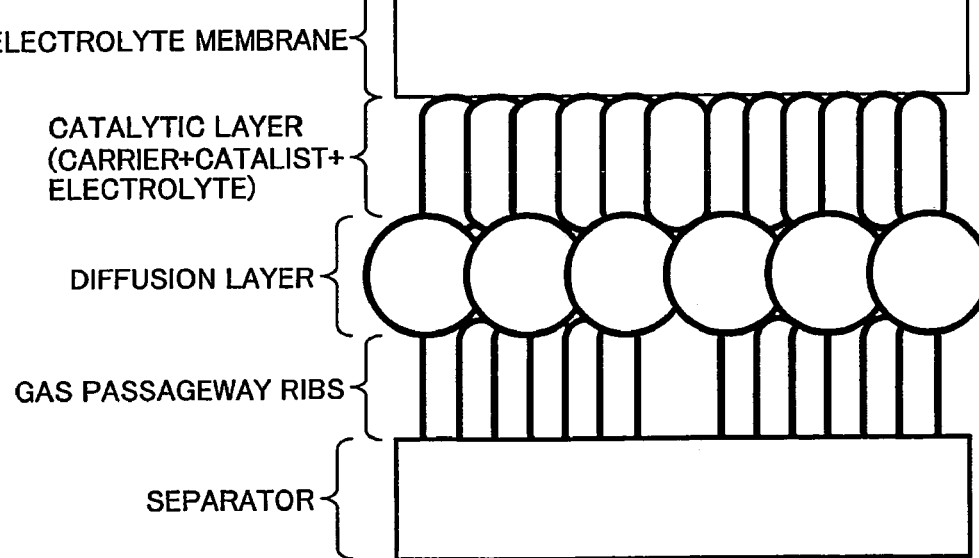

FIG. 3 schematically shows the invention. FIG. 3A shows catalyst layers sandwiching a solid polymer membrane, and separators disposed further outside the catalyst layers. FIG. 3B shows an enlarged view of FIG. 3A, showing a separator, gas channel ribs patterned on the separator, a diffusion layer, a catalyst layer, and an electrolyte membrane on the catalytic layer.

Figure 4:
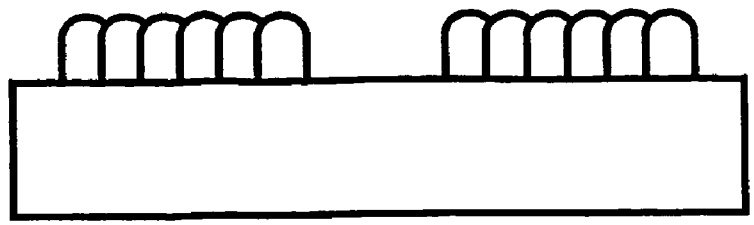
FIGS. 4A-4D schematically show a manufacturing process according to the invention.
Figure 4:
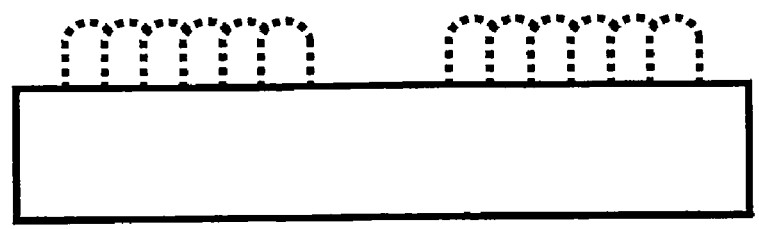
Figure 4:
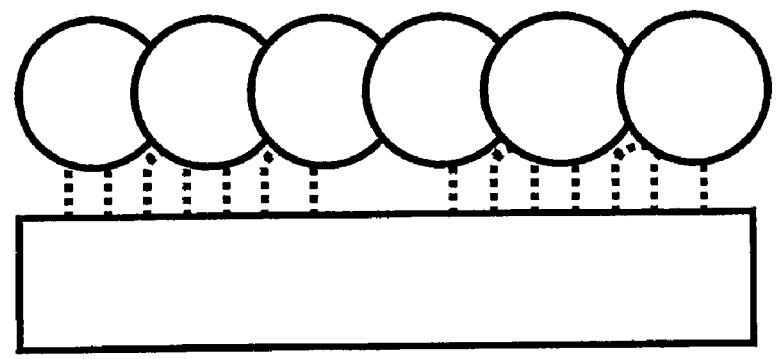
Figure 4:
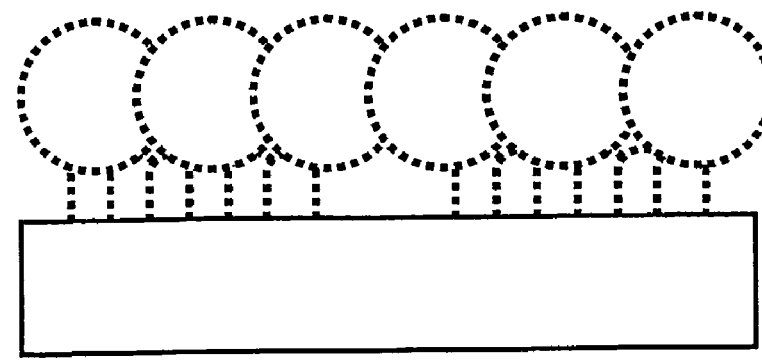
Figure 5:
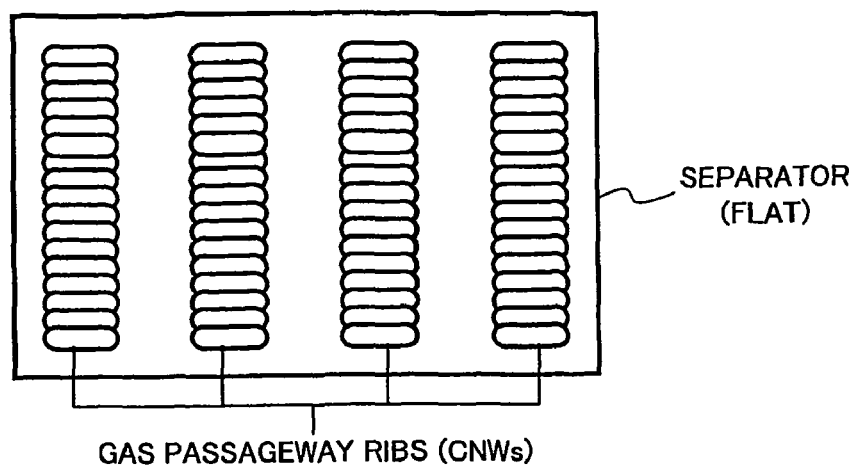
FIGS. 5A-5D show examples of patterns of a channel structure.
Figure 5:
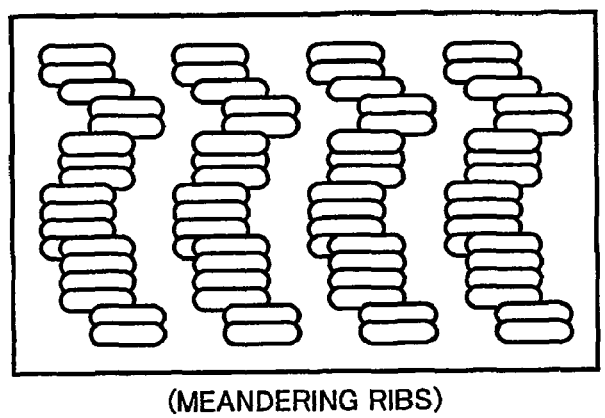
Figure 5:
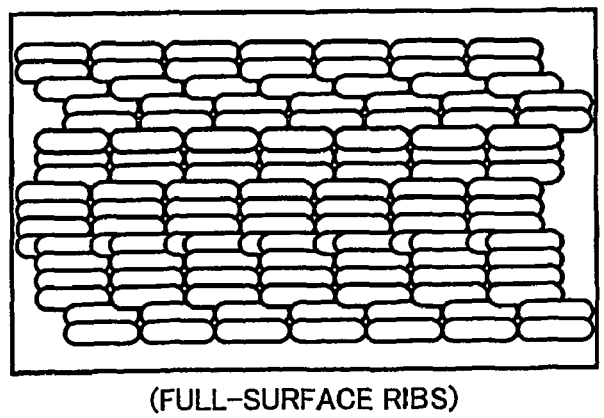
Figure 5:
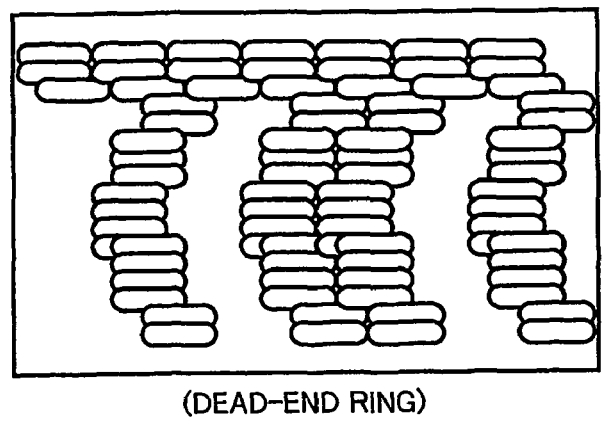

FIG. 4 schematically shows a manufacturing process. FIG. 4A shows the growth of gas channel ribs on a flat conductor by patterning, using the address control technique, for example. FIG. 4B shows the imparting of hydrophilicity/hydrophobicity to the surface of carbon by chemical reaction. FIG. 4C shows the growth of a diffusion layer by a microfabrication technology whereby a sacrifice layer is provided or patterning is varied in a stepwise manner, with the gas channel left on the conductor. FIG. 4D shows the imparting of hydrophilicity/hydrophobicity to the carbon surface by chemical reaction.

In accordance with the invention, preferably CNWs are grown on a flat conductor by patterning in the step of FIG. 4A. Examples of patterned channel structures as seen from the direction perpendicular to the membrane are shown in FIG. 5A to 5D.

While the invention is described hereafter with reference to specific examples, it is to be noted that the invention is not limited to those examples.

EXAMPLE 1

An example of a method of manufacturing a fuel cell separator with a rib portion formed with CNWs is described below, together with relevant manufacturing conditions. As a current collector plate, a stainless-steel plate measuring 30 mm×30 mm with a thickness of 0.11 mm was used. The stainless-steel plate was disposed in a chamber with a structure based on the above-described method of forming CNWs. $C_2F_6$ was then caused to flow into the chamber, and a channel with a desired shape was formed by address control over a period of eight hours. The height of the ribs was 1.4 μm. Using this structure as a separator, an FC small cell with an area of 1 $cm^2$ was prepared, and its cell performance was measured.

EXAMPLE 2

A current collector structure was prepared in which the CNW of Example 1 was further grown until it was integrated with the diffusion layer. The separator rib in a fuel cell has the role of feeding as much gas as possible to the reaction site and another role of enabling the current-collection to be performed effectively. Meanwhile, the diffusion layer in a fuel cell has the role of applying uniform pressure on the reaction electrodes so as to reduce contact resistance, as well as causing gases to flow below the gas channel ribs.

However, in the prior art, the diffusion layer and the separator are separate components, resulting in the problem of contact resistance and high cost. Other problems are also expected, such as one in which the behavior of the water produced by the fuel cell reaction at the contact portion becomes irregular.

Figure 6:
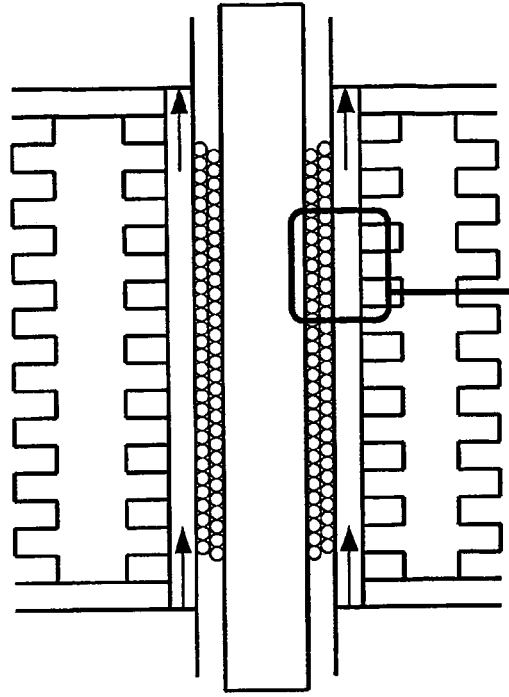
FIGS. 6A and 6B show a cross section of another example of the fuel cell separator according to the invention.
Figure 6:
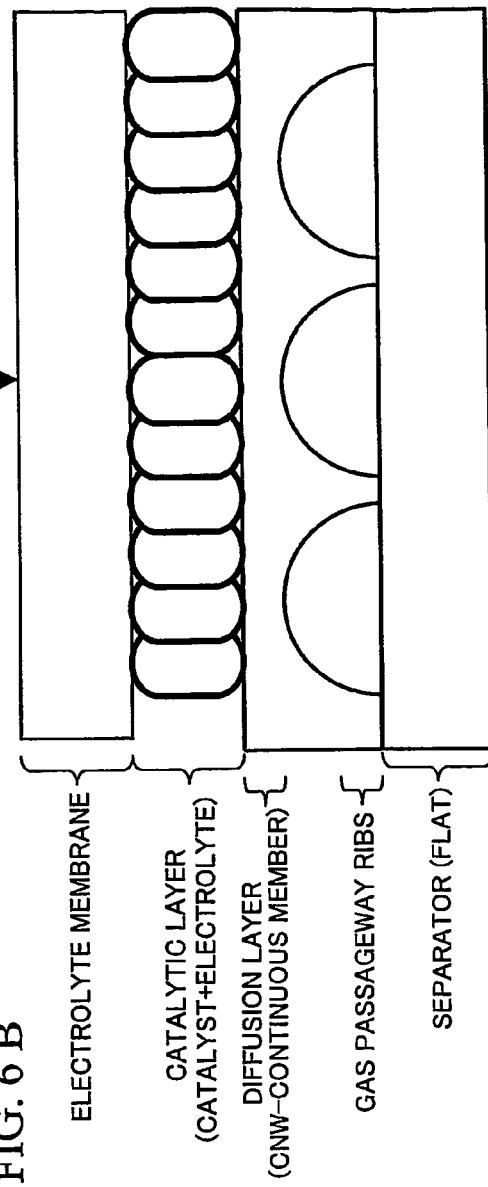

To overcome these problems, CNWs were grown on a flat electrode plate (which may be either carbon or metal) until it was integrated with the diffusion layer as shown in FIGS. 6A and 6B, thereby preparing an electrode structure.

Specifically, CNWs were grown on a flat carbon or metal plate based on an arrangement of plasma electrodes such that the CNWs could be grown into a predetermined pattern. The carbon or metal may be provided with a surface treatment. The shape of the channel is not particularly limited. It is also possible to achieve a smooth flow of gas in the ribs by taking advantage of the fact that CNWs can be given a directionality.

In accordance with such an integrated structure, cost reduction can be expected and, due to the absence of an interface, contact resistance can be reduced and therefore higher cell performance can be achieved.

As a current collector plate, a stainless-steel plate measuring 30 mm×30 mm with a thickness of 0.11 mm was used. A $SiO_2$ membrane was patterned on the stainless-steel plate so as to form a desired gas channel shape with a thickness of 1 μm. The plate was then disposed within a chamber with a structure based on the aforementioned preparation method, and $C_2F_6$ was caused to flow into the chamber so as to grow CNWs with a designated thickness over a period of eight hours. Thereafter, the surface was polished by chemical mechanical polishing (CMP) until the $SiO_2$ surface was exposed. The plate was again disposed in the chamber with the structure based on the aforementioned preparation method, and $C_2F_6$ was caused to flow into the chamber, whereby the CNWs were grown to a designated thickness over eight hours. The sacrifice layer consisting of $SiO_2$ was then removed by wet etching using fluorinated acid or the like, thereby forming an integrated structure with a cross section shown in FIG. 6. Using this integrated-structure current collector, a small FC cell was prepared and its performance was measured.

EXAMPLE 3

The CNW patterns obtained in Examples 1 and 2 were subjected to hydrophilic/hydrophobic treatment so as to obtain a structure with an improved drainage property. The fuel cell separator ribs have the two roles, one to feed as much gas as possible to the reaction site, and the other to enable the current collection to be performed effectively. The diffusion layer in a fuel cell, on the other hand, has the role of causing gas to flow below the gas channel ribs, and another role of applying uniform pressure to the reaction electrodes so as to reduce contact resistance. The separator ribs and the diffusion layer are both typically provided with a water repellent treatment on the surface thereof so that the produced water can be drained effectively.

However, in the current state of the art, water-repellent treatment cannot be performed at appropriate portions of the diffusion layer and the separator. As a result, sufficient drainage property cannot be obtained.

Thus, the CNW patterns obtained in Examples 1 and 2 were provided with a hydrophilic/hydrophobic treatment so as to improve the drainage property within the cell.

Figure 7:
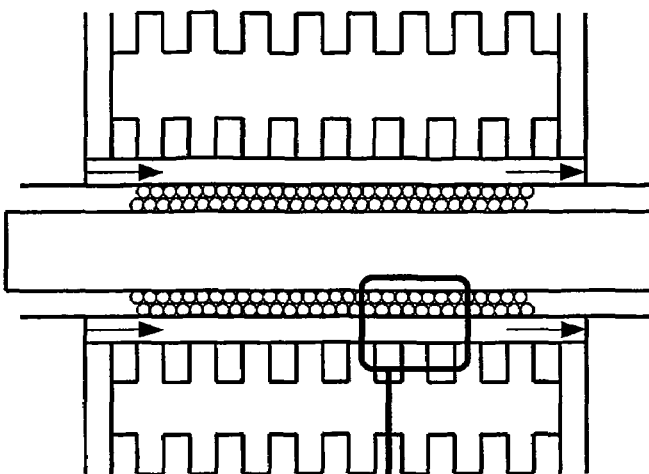
FIGS. 7A-7C show a cross section of another example of the fuel cell separator according to the invention.
Figure 7:
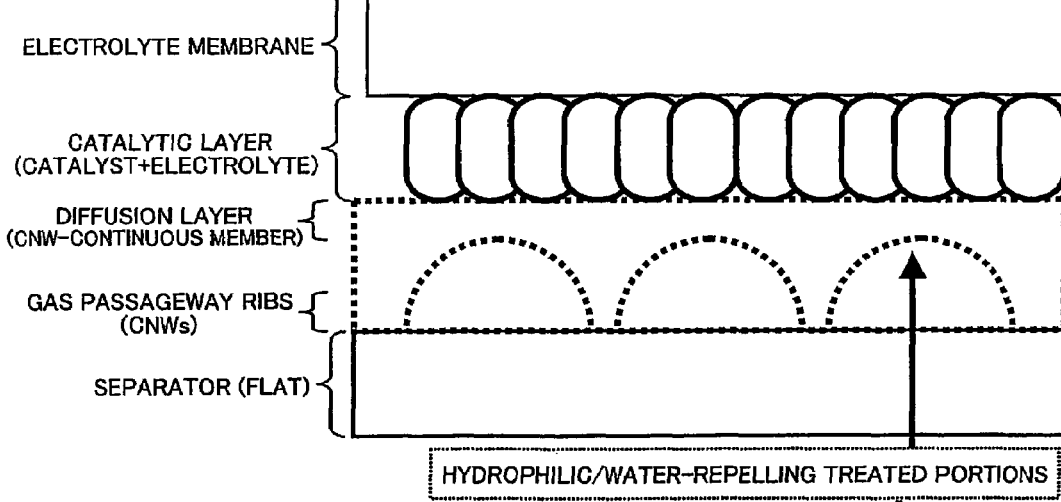
Figure 7:
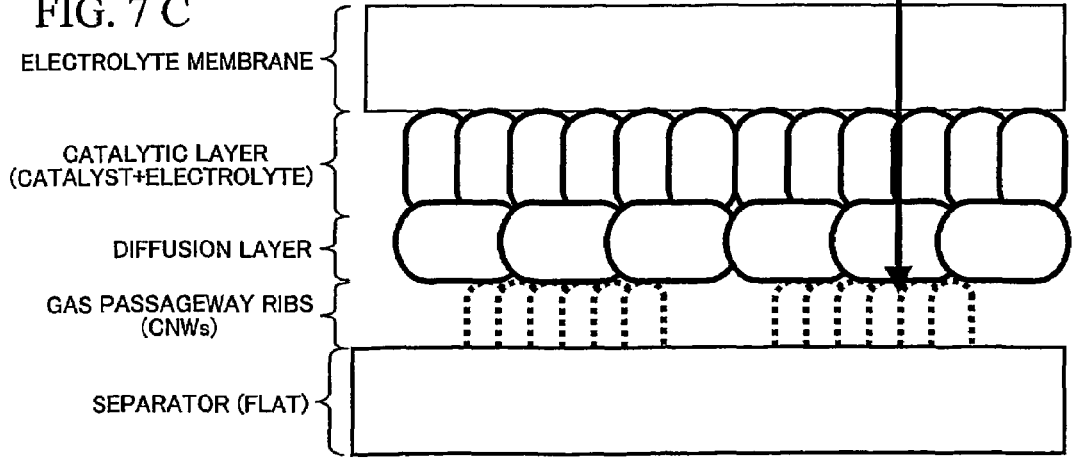

Specifically, CNWs were grown on a flat plate of carbon or metal based on an arrangement of plasma electrodes such that the CNWs could be grown into a predetermined pattern. The carbon or metal may be provided with a surface treatment. During or after the CNW reaction, portions where drainage was required were subjected to a fluorination treatment or a hydroxyl-group treatment so as to provide these portions with water-repellency, as shown in FIG. 7A to 7C.

By performing these treatments, the cell drainage property can be improved and the problems relating to the increase in diffusion polarization due to lack of gas supply and the flooding phenomenon, which would lead to a sharp reduction in cell performance, can be prevented. As a result, cell performance can be improved.

When the treatment involving a fluorinated group or hydroxyl group is performed, the ratio of modification on the CNW surface area is preferably 10% to 90% and more preferably 30% to 70%. If too much of these functional groups are given, the electron conductivity would be decreased, while too little of them would lead to an insufficient drainage property.

The CNW surface was chemically modified on the side of the diffusion layer of the separator/diffusion layer prepared in accordance with Examples 1 and 2, by the PECVD method using a gas containing fluorine atoms. Thereafter, a small FC cell was prepared using the current collector structure, and its cell performance was measured.

EXAMPLE 4

In this example, a punching metal is used as the masking plate in accordance with the following procedure.
(1) A flat substrate on which CNW is to be formed is covered with a masking plate (which may be made of any material, including metals, as long as it is capable of withstanding the CNW forming conditions) that is provided with desired rib shapes to be patterned, using a slit or a punch, for example.
(2) CNW is formed on top of the masking plate (under the same growth conditions as those in the foregoing examples).
(3) The masking plate is removed.
(4) A separator is obtained that has the rib shapes formed thereon by the CNW.

Figure 8:
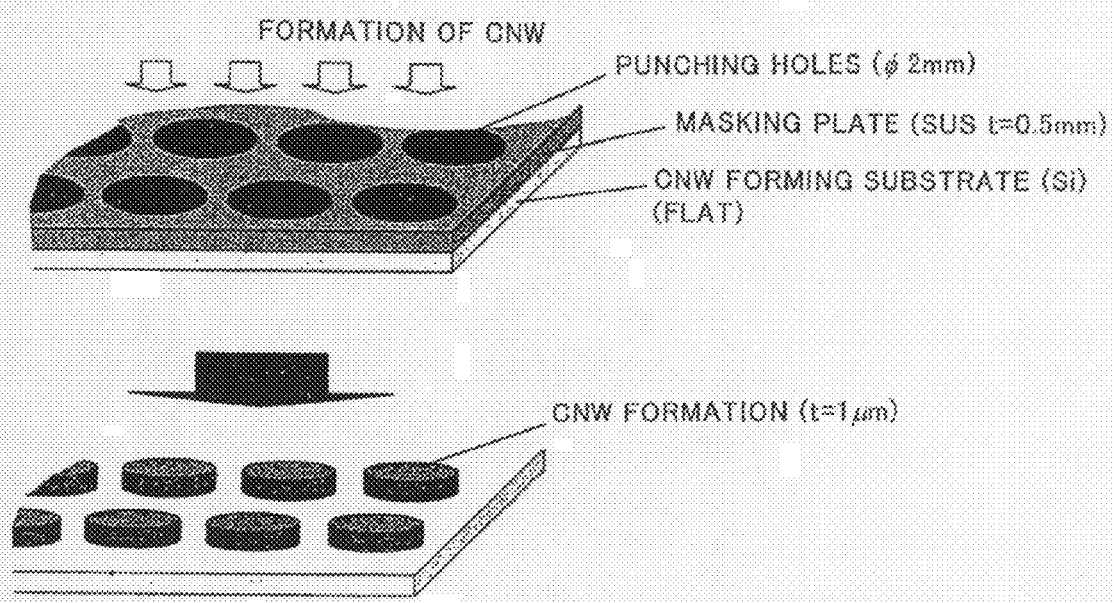
FIG. 8 shows a conceptual chart of a process according to Example 4 involving the use of a punching metal as the masking plate.
Figure 9:
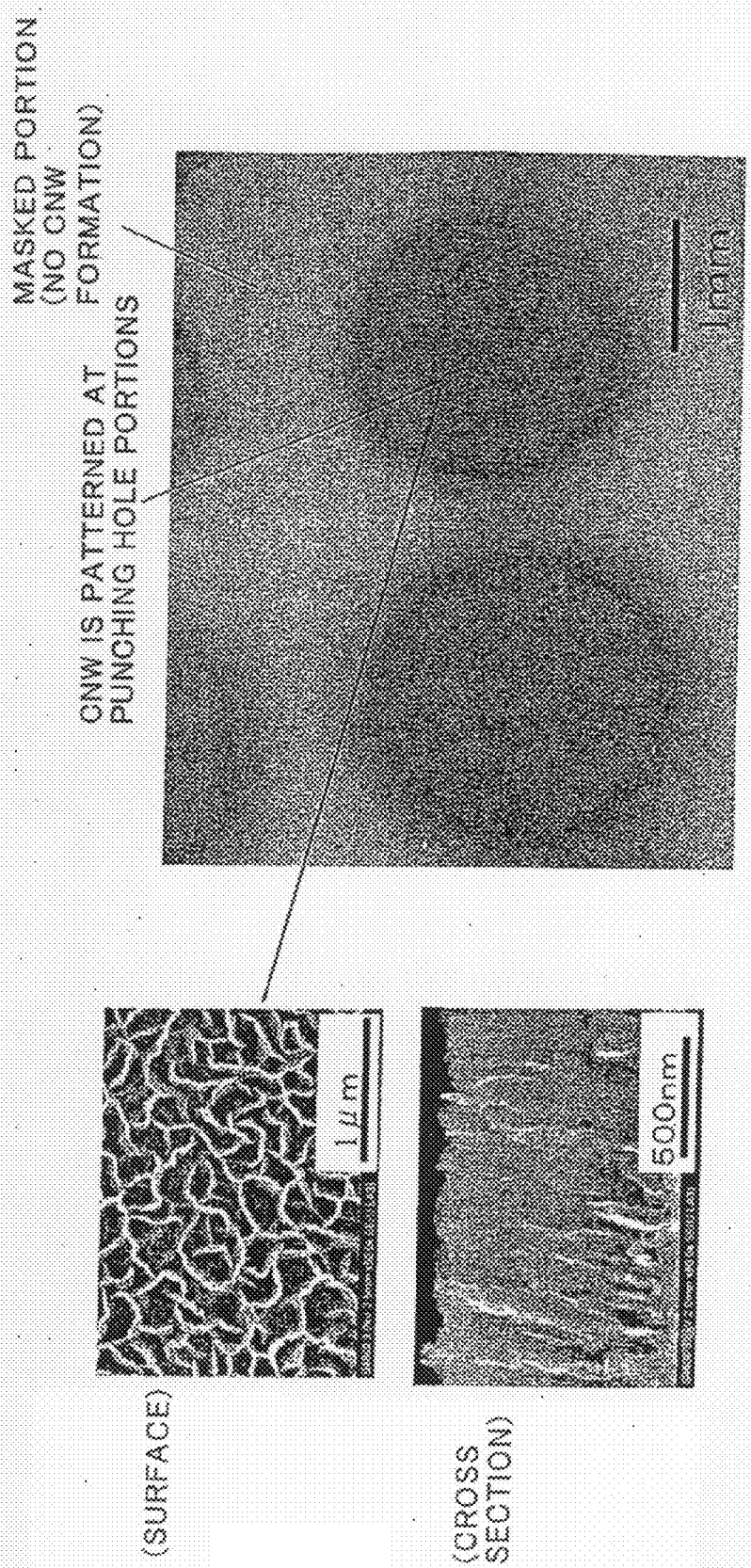
FIG. 9 shows an optical microscopic image (right) of a patterned substrate surface, and SEM images (left) of the surface and cross section of the patterned CNW portion.

FIG. 8 shows conceptually the above-described steps (1) to (4). FIG. 9 shows an optical microscopic image (right) of the patterned substrate surface, and SEM images (left) of the surface and a cross section of the patterned CNW portion.

EXAMPLE 5

In this example, gas channel ribs are patterned by etching in accordance with the following procedure.
(1) CNW is Formed on a Flat Substrate (Under the Same Growth Conditions as Those in the Foregoing Examples).
(2) An $SiO_2$ Layer is Formed on the CNW.

A film with a thickness of 1.2 μm is formed using a VHF capacitively coupled plasma, with the gas flow rates of 5 sccm for $SiH_4$, 10 sccm for $O_2$, and 250 sccm for Ar at the vacuum level of 80 mTorr and with the discharge power of 1 kW at 60 MHz.

(3) Application of a Resist
i) Pretreatment (Organic Washing)

Acetone ultrasound washing is performed for 5 minutes, followed by ethanol ultrasound washing for 5 minutes. These steps are repeated twice so as to wash the sample surface.
ii) Coating In order to improve the wettability of the resist material on the sample surface, a surfacing primer is applied using a spinner (at 2000 r.p.m. for 30 seconds). Then, a positive-type g-line photoresist (S1805) for microfabrication is applied with an accelerated rotation of 500 r.p.m. for 2 seconds and a steady rotation of 5000 r.p.m. for 25 seconds.
iii) After the resist coating is completed, soft baking is performed at 100° C. for 30 minutes under air convection.
(4) Patterning of the Resist Layer: 5, 10, and 50 μm Patterns are Drawn
i) Exposure Using Ultraviolet Ray (g-Line)

A glass plate having a pattern with UV-transmitting portions and non-UV-transmitting portions engraved thereon is disposed on the sample and is irradiated with an ultraviolet ray for 8 seconds, using a mask aligner/exposure apparatus (K-310P100/K-310P100S) as an exposure apparatus. After the exposure is completed, the sample is immersed in a developer (Microposit Mf-319 Developer, available from Rohm and Haas Company) for 2 minutes so as to cure the resist, and then the portions of the resist film that have been irradiated with the UV ray are removed. After checking the pattern using SEM or an optical microscope, hard baking is performed at 120° C. for 60 minutes under air convection.
(5) Etching of the $SiO_2$ Layer Using a dual-frequency capacitively coupled plasma, etching is performed with discharge gases $C_4F_8$ at 20 sccm; Ar at 400 sccm; and $O_2$ at 10 sccm, at the vacuum level of 30 mTorr, and with the discharge power of 2 kW at 60 MHz for RF and 0.8 kW at 2 MHz for biasing, for 3.5 minutes.
(6) Etching of CNW CNW etching is performed using a dual-frequency capacitively coupled plasma with the discharge gas $O_2$ at 180 sccm, at the vacuum level of 80 mTorr, and with the discharge power of 2 kW for RF at 60 MHz, bias:0.8kW at 2 MHz, for 2 minutes.
(7) Removal of the $SiO_2$ Layer A chemical etching method is used. The concentration of hydrofluoric acid (HF) is adjusted with distilled water, and the $SiO_2$ film on the CNW is removed.

Figure 10:
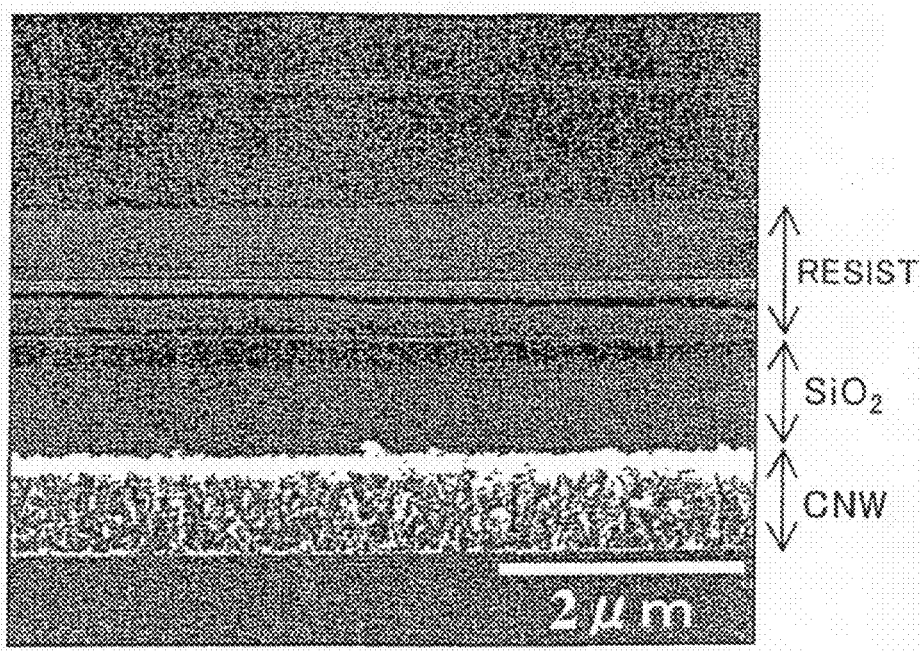
FIG. 10 shows a cross-sectional SEM image after the application of a resist in Example 5.
Figure 11:
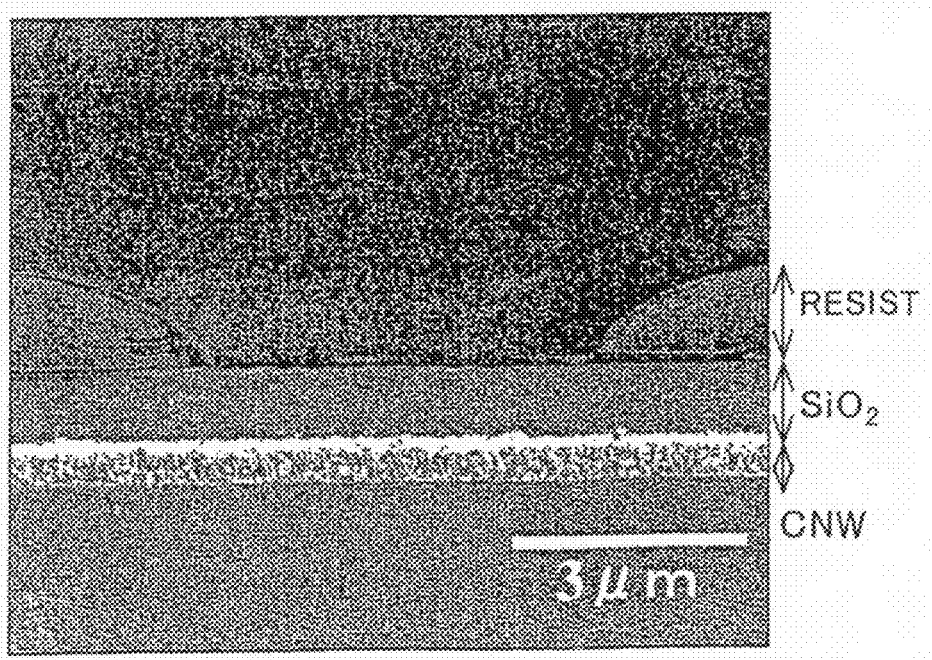
FIG. 11 shows a cross-sectional SEM image after patterning in Example 5.
Figure 12:
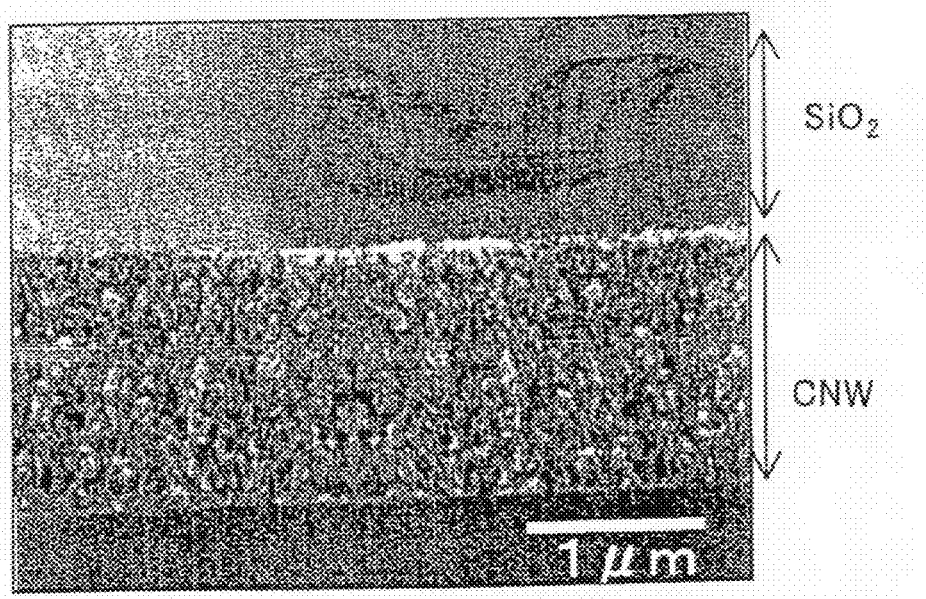
FIG. 12 shows a cross-sectional SEM image after the etching of an $SiO_2$ layer in Example 5.
Figure 13:
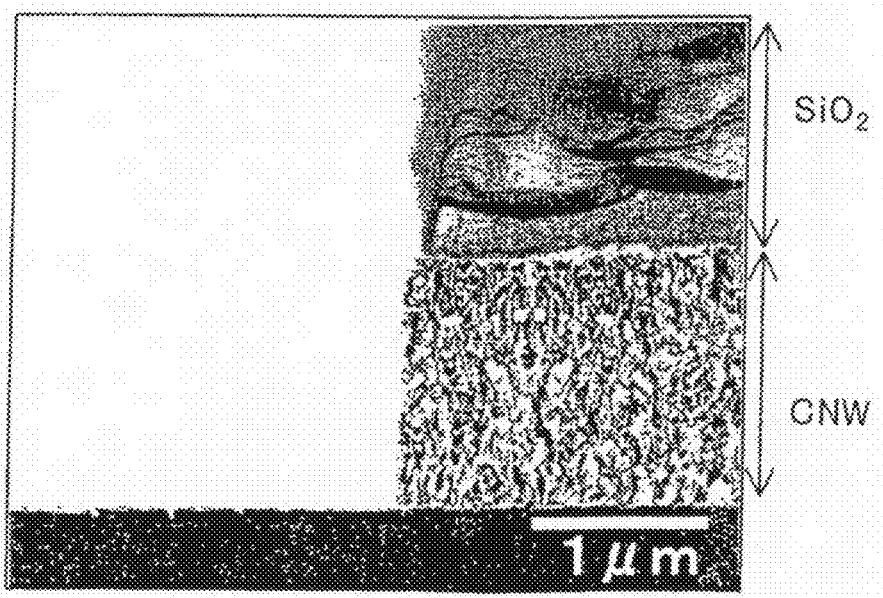
FIG. 13 shows a cross-sectional SEM image after CNW etching in Example 5.

FIG. 10 shows a cross-sectional SEM image following the application of a resist. FIG. 11 shows a cross-sectional SEM image after patterning. FIG. 12 shows a cross-sectional SEM image after etching the $SiO_2$ layer. FIG. 13 shows a cross-sectional SEM image after the CNW etching.

EXAMPLE 6

In this example, the CNW surface is provided with a hydrophilic group by an atmospheric nonequilibrium $H_2O$ plasma process in accordance with the following procedure.
(1) CNW is formed on a flat substrate (under the same growth conditions as in the foregoing embodiments)
(2) Gas channel ribs are formed by patterning (including masking and etching, for example)
(3) The CNW surface is provided with hydrophilicity using a microwave-excited atmospheric $H_2O$ plasma.

For the generation of a CW (continuous wave) microwave, a microwave excitation atmospheric plasma apparatus (with a high electron density of $10^{14}$ cm$^{-3}$) is used, together with micro-gap electrodes and gases He at 8 L/min and $H_2O$ at 193 sccm (introduced by bubbling using He as a carrier gas). The pressure is 1 atm, the microwave power is 500 W. and the distance between the electrodes is 2.5 mm. Plasma irradiation is conducted for 30 seconds.

Figure 14:
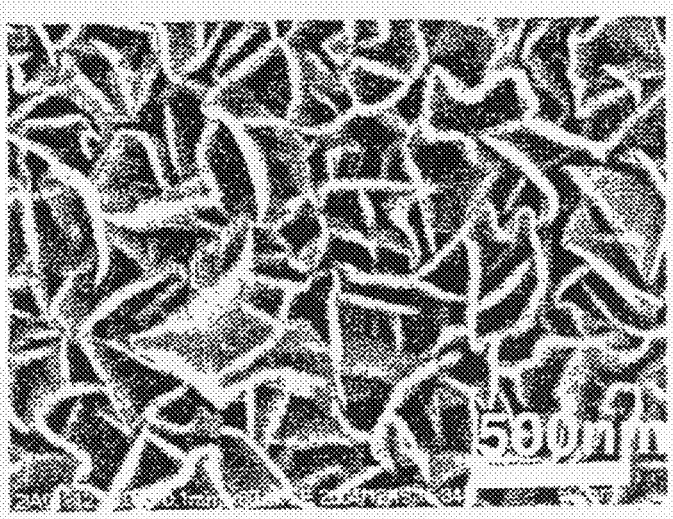
FIGS. 14A and 14B show SEM images before (FIG. 14A) and after (FIG. 14B) of an $H_2O$ plasma process.
Figure 14:
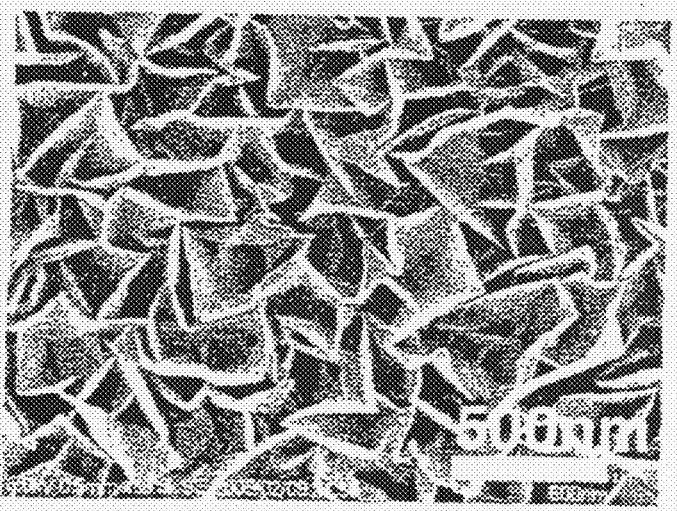

FIGS. 14A and 14B show SEM images of the CNW surface before (FIG. 14A) and after (FIG. 14B) the $H_2O$ plasma process. The results shown in FIGS. 14A and 14B show no change in the shape of the CNW surface, indicating there has been no damage.

Figure 15:
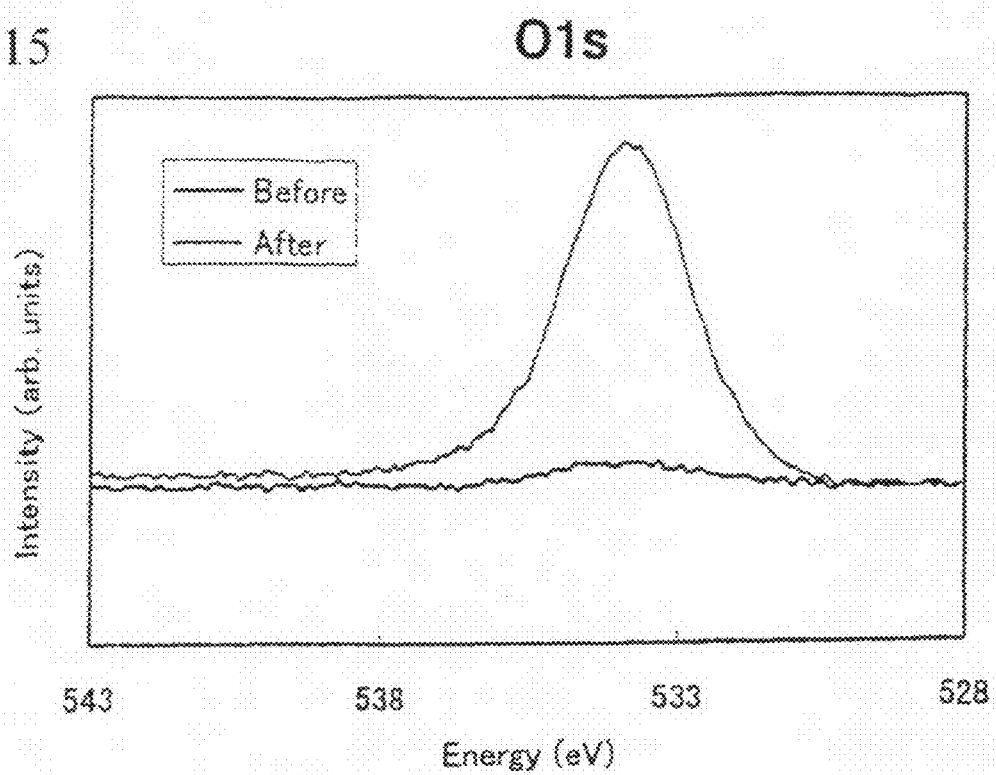
FIG. 15 shows the result of an XPS analysis concerning the CNW surface condition before and after plasma process.

FIG. 15 shows the result of an XPS analysis concerning the CNW surface condition before and after the plasma process. The result suggests that hydrophilic groups, such as C=O and C—O—H, have been introduced.

Figure 16:
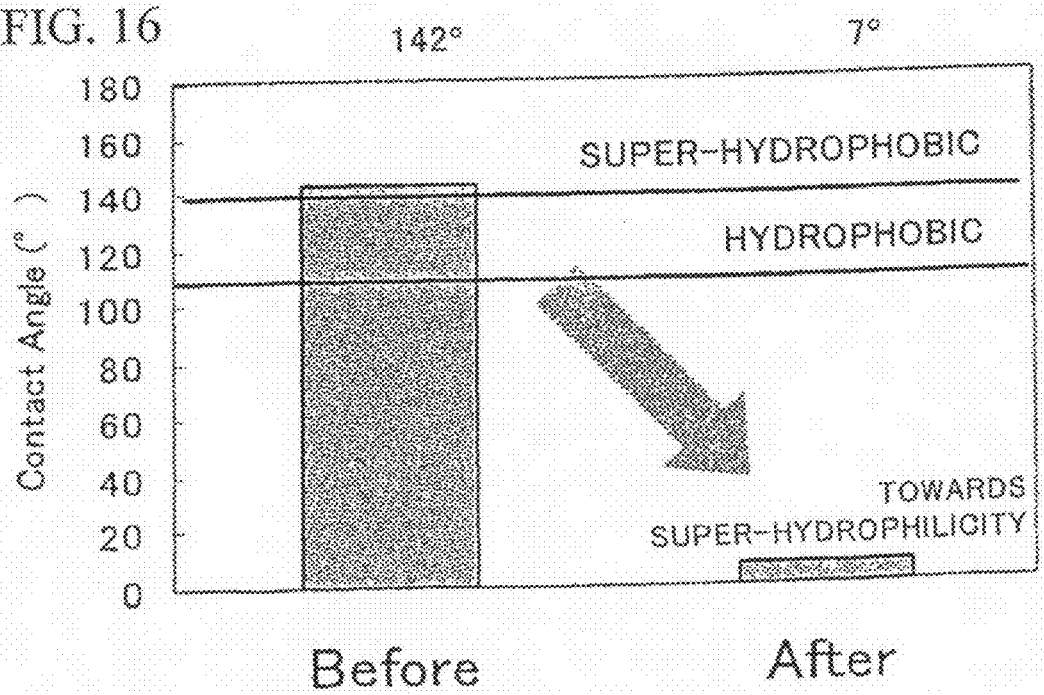
FIG. 16 shows the change in the CNW surface contact angle (droplet) before and after plasma process.
Figure 17:
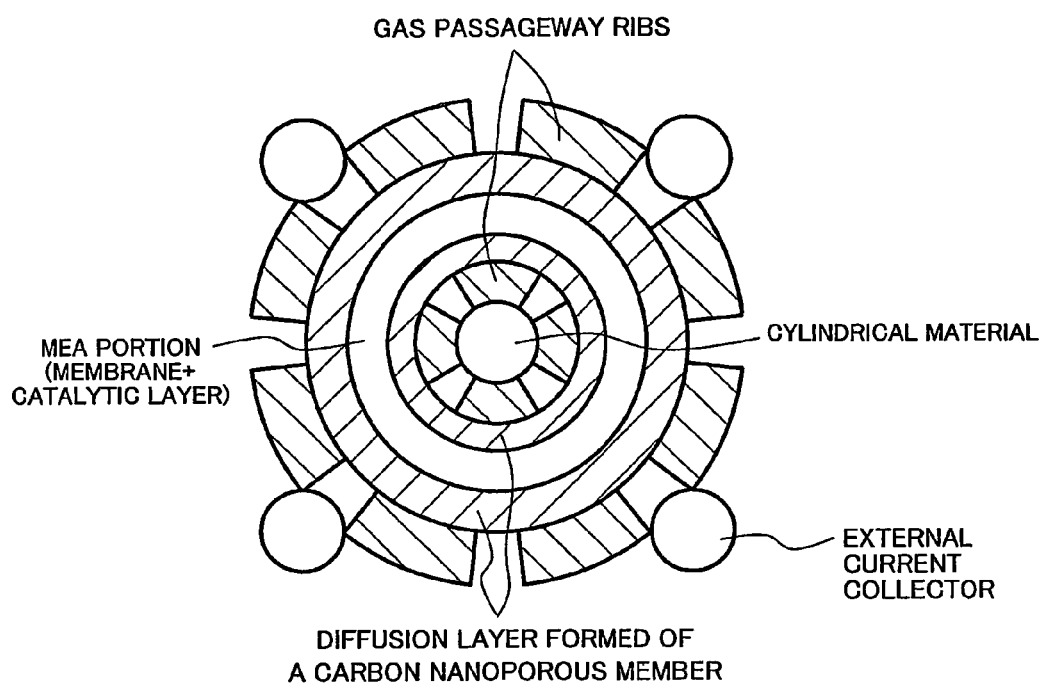
FIG. 17 shows a cross section of another example of the fuel cell separator according to the invention.

FIG. 16 shows the change in the CNW surface contact angle (droplet) before and after the plasma process. The result indicates that the hydrophilicity has been enhanced by the process to such an extent that super-hydrophilicity can be obtained.

EXAMPLE 7

The invention was applied to a cylindrical fuel cell. In a cylindrical fuel cell, a current collector typically consists of a conductive material with a porous or similar structure disposed at the center thereof. In this structure, however, gases cannot be sufficiently distributed above the electrodes and, in addition, pressure loss increases, such that system loading can be expected to increase.

To overcome these problems, a carbon nanoporous member was grown on a cylindrical material into a predetermined pattern, such that the feeding of the fuel or oxidizing gas to the reaction site can be facilitated. The cylindrical material or the carbon porous member may be provided with a surface treatment. During or after the growth of the carbon porous member, water-repellency/hydrophilicity may be provided. Specifically, the portions where drainage property is required may be provided with a fluorination treatment, and the portions where hydrophilicity is required may be provided with a hydroxyl-group treatment.

Optionally, the carbon nanoporous member may further be grown to reach the diffusion layer with the gas channel left intact. In this way, an electrode structure with reduced contact resistance can be obtained.

In this structure, it can be expected that the aforementioned gas distribution capability can be improved and the pressure loss and contact resistance can be reduced, and improved cell performance was achieved.

As a current collector, an anti-corrosion-treated stainless-steel bar with a diameter φ of 5 mm and a length of 10 cm was used. This stainless-steel bar was disposed in a chamber with a structure based on the aforementioned method of preparing CNWs, and then $C_2F_6$ was caused to flow into the chamber. A designated channel shape was then grown by address control over eight hours. The resultant rib height was 1.4 μm. Using the current collector structure obtained, FC cell performance was measured.

Based on the results of Examples 1 to 7 of the invention, it can be expected that the fuel cell separator according to the invention has superior gas permeability and electrical conductivity to those of the conventional separators.

INDUSTRIAL APPLICABILITY

In accordance with the invention, (1) the degree of freedom of designing a gas channel is increased; (2) diffusion polarization can be reduced because a gas channel to the rib portion is ensured; (3) the contact resistance between the separator and the GDL can be reduced; and (4) flooding can be prevented by the improvement in drainage property below the gas channel ribs. As a result, better cell performance stability can be achieved. Furthermore, in accordance with the invention, an integrated cell structure can be manufactured through a series of operations involving vapor-phase reaction, so that the manufacturing cost can be reduced. Thus, the invention contributes to the wider use of the fuel cells.

The invention claimed is:

1. A fuel cell separator comprising a separator substrate on which gas channel ribs are formed through vapor-phase growth of a carbon nanowall having a wall shaped structure where walls rise upward in substantially uniform directions from a surface of the separator substrate, wherein a hydrophilic group and/or a hydrophobic group is provided on a surface of said gas channel ribs, and wherein the separator substrate is configured for being part of a fuel cell.

2. The fuel cell separator according to claim 1, wherein said gas channel ribs are patterned.

3. The fuel cell separator according to claim 1, wherein a gas diffusion layer is formed on said gas channel ribs through vapor-phase growth of a carbon-based material.

4. The fuel cell separator according to claim 3, wherein a hydrophilic group and/or a hydrophobic group is provided on a surface of said gas diffusion layer by chemical reaction.

* * * * *